(12) United States Patent
Lindberg et al.

(10) Patent No.: US 12,049,392 B2
(45) Date of Patent: Jul. 30, 2024

(54) ROPE FASTENING ARRANGEMENT OF HOISTING DEVICE

(71) Applicant: Konecranes Global Corporation, Hyvinkää (FI)

(72) Inventors: Teppo Lindberg, Hyvinkää (FI); Mats Åkesson, Hyvinkää (FI)

(73) Assignee: KONECRANES GLOBAL CORPORATION, Hyvinkaa (FI)

( * ) Notice: Subject to any disclaimer, the term of this patent is extended or adjusted under 35 U.S.C. 154(b) by 288 days.

(21) Appl. No.: 17/753,575

(22) PCT Filed: Sep. 8, 2020

(86) PCT No.: PCT/FI2020/050575
§ 371 (c)(1),
(2) Date: Mar. 8, 2022

(87) PCT Pub. No.: WO2021/048466
PCT Pub. Date: Mar. 18, 2021

(65) Prior Publication Data
US 2022/0340401 A1 Oct. 27, 2022

(30) Foreign Application Priority Data
Sep. 9, 2019 (FI) ..................................... 20195742

(51) Int. Cl.
*B66D 3/00* (2006.01)
*B66D 3/26* (2006.01)
*F16G 11/04* (2006.01)

(52) U.S. Cl.
CPC .............. *B66D 3/26* (2013.01); *F16G 11/046* (2013.01); *F16G 11/048* (2013.01)

(58) Field of Classification Search
CPC ........... B66D 3/26; B66D 1/28; F16G 11/046; F16G 11/048; B66C 13/00
See application file for complete search history.

(56) References Cited

U.S. PATENT DOCUMENTS

| | | | |
|---|---|---|---|
| 2,184,466 A | 12/1939 | Ost et al. | |
| 4,718,788 A | * 1/1988 | Briscoe | ................. F16G 11/046 24/115 M |

(Continued)

FOREIGN PATENT DOCUMENTS

| | | |
|---|---|---|
| EP | 3150546 A1 | 4/2017 |
| JP | H10274291 A | 10/1998 |

(Continued)

OTHER PUBLICATIONS

Extended European Search Report for European Application No. 20862668.9, dated Oct. 12, 2022.

(Continued)

*Primary Examiner* — Emmanuel M Marcelo
(74) *Attorney, Agent, or Firm* — Birch, Stewart, Kolasch & Birch, LLP

(57) ABSTRACT

A rope fastening arrangement of a hoisting device, which comprises a rope drum, a fastening device having a chamber which defines the vertical boundary dimensions, the horizontal boundary dimensions, and depth direction boundary dimensions of the fastening device, a hoisting rope and a hoisting member which by means of the hoisting rope ascends and descends supported by the fastening device and rope drum. Said rope fastening arrangement further comprises that the hoisting rope (4) is locked to the fastening device by wedging, whereby the fastening device guides the first end of the hoisting rope away so that the first end of the hoisting rope does not extend outside the vertical boundary dimensions of the chamber.

16 Claims, 9 Drawing Sheets

(56) References Cited

U.S. PATENT DOCUMENTS

| | | | | |
|---|---|---|---|---|
| 4,845,814 | A * | 7/1989 | Crook | F16G 11/048 24/135 R |
| 5,553,360 | A * | 9/1996 | Lucas | F16G 11/046 24/115 M |
| 5,988,941 | A * | 11/1999 | Sargent | B63C 3/06 187/372 |
| 6,484,368 | B1 * | 11/2002 | Rivera | B66B 7/085 24/122.6 |
| 6,854,164 | B2 * | 2/2005 | Bass | F16G 11/046 24/115 M |
| 6,994,487 | B2 * | 2/2006 | Traktovenko | F16G 11/046 24/115 M |
| 8,359,714 | B2 * | 1/2013 | Harper | F16G 11/06 24/115 R |
| 8,381,364 | B2 * | 2/2013 | Kubo | F16G 11/046 24/136 L |
| 8,505,173 | B2 * | 8/2013 | Pitts | B66B 7/085 24/136 R |
| 2002/0154944 | A1 | 10/2002 | Traktovenko et al. | |
| 2021/0179401 | A1 * | 6/2021 | Tähtinen | F16G 11/04 |
| 2024/0010465 | A1 * | 1/2024 | Vandamme | F16G 11/048 |

FOREIGN PATENT DOCUMENTS

| | | |
|---|---|---|
| JP | 3722585 B2 | 11/2005 |
| NL | 6408825 A | 12/1965 |
| WO | 0151400 A1 | 7/2001 |
| WO | 2019115879 A1 | 6/2019 |

OTHER PUBLICATIONS

Chinese Office Action and Search Report for Chinese Application No. 202080063576.6, dated Dec. 26, 2023, with English translation.

* cited by examiner

ROPE FASTENING ARRANGEMENT OF HOISTING DEVICE

BACKGROUND ART

The invention relates to a rope fastening arrangement of a hoisting device to lock an end of a hoisting rope.

Hoisting devices make use of a hoisting rope to hoist and lower a hoisting member. The hoisting height of the hoisting member is limited by the fastening arrangement of a free end of the hoisting rope, which in known solutions takes up space to achieve a rigid fastening and limit the hoisting height of the hoisting device. In some solutions, the fastening of the rope end resides in a separate structure.

It is an object of the solution disclosed herein is to develop a rope fastening arrangement that is simple and compact as well as maximises the hoisting height of the hoisting device.

SUMMARY

It is therefore the object of the invention to develop a new type of rope fastening arrangement of a hoisting device so that the aforementioned problems may be solved. The object of the invention is achieved by the hoisting rope arrangement according to the invention, which is characterised by what is stated in the independent claim. Preferred embodiments of the invention are disclosed in the dependent claims.

When a hoisting rope is locked to a fastening device by wedging, and the fastening device guides a first end of a hoisting rope away so that the first end of the hoisting rope does not extend outside vertical boundary dimensions of a chamber, a compact and simple rope fastening arrangement is achieved which allows the hoisting height of the hoisting member to be maximised, making use of the available free height, and improves the positioning of the hoisting device in relation to the structures that support it. With a compact fastening of the rope to the hoisting device, the hoisting forces are equally spread on the pulleys of the hoisting device, and the body of the hoisting device is not subjected to rotating or twisting forces. When the pulleys of the hoisting device carry the load equally, independent of the extent of the load, the hoisting event becomes safer.

BRIEF DESCRIPTION OF THE DRAWINGS

The invention will now be described in more detail in connection with preferred embodiments and with reference to the accompanying drawings, in which.

DETAILED DESCRIPTION

Figure 1:
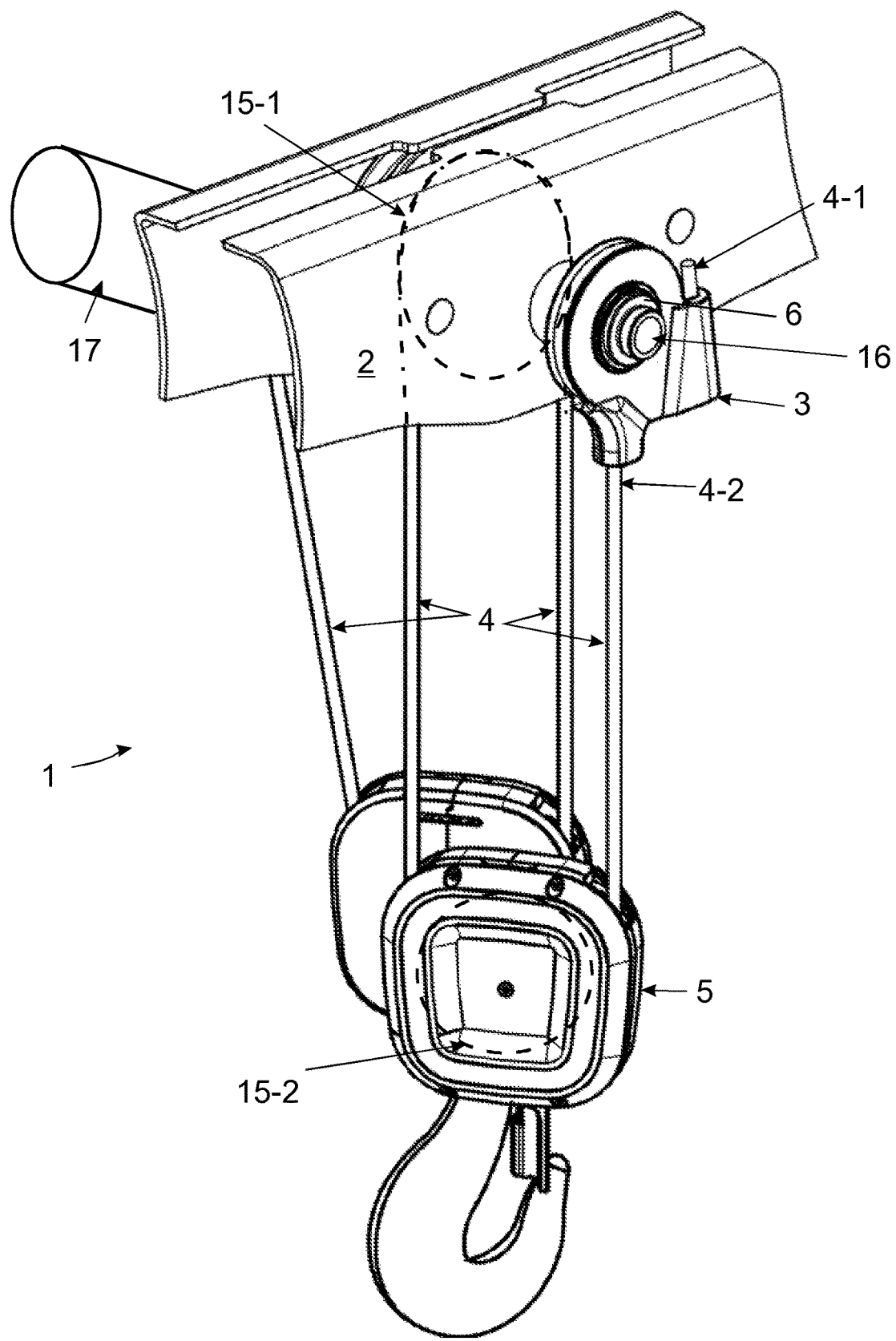
FIG. 1 shows a hoisting device having the inventive rope fastening arrangement in the body structure.

FIG. 1 shows a hoisting device 1 which comprises a rope drum 17, support body structure 2, at least one rope pulley 15-1 within it, fastening device 3, hoisting rope 4, and hoisting member 5. The hoisting member 5 comprises at least one rope pulley 15-2, and by means of the hoisting rope the hoisting member 5 ascends and descends, supported by the fastening device 3 and rope drum 17.

The hoisting device 1 shown in FIG. 1 uses an even number of ropings. The number of ropings in this case refers to how many fold a suspension there is between the support body structure 2 and hoisting member 5. FIG. 1 shows a four-fold suspension with one rope, which may be denoted by 1×4.

The fastening device 3 may be made of, for example, cast iron or steel, and the hoisting rope 4 may be round steel rope, because steel requires relatively little friction surface in the longitudinal direction of the rope. The shape of the rope may also differ from round. In the embodiment shown in FIG. 1, a first end 4-1 of the hoisting rope stays free, pointing upwards, and a second end 4-2 is in contact with the rope drum 17, fastened through at least one rope pulley 15,1 15-2. The rope drum 17 is located behind the support body structure 2, and the rope force of the hoisting rope 4 is produced by rotating the rope drum 17 by means of a motor and gear. Usually, the motor is an electric motor designed to produce the required torque to rotate the rope drum 17. Hoisting movement up or down is electrically stopped by means of the electric motor, and the hoisting device additionally features a mechanical brake.

In this embodiment, the fastening device 3 has a round through-hole 6 and it is fastened on a side of the support body structure 2. The fastening is advantageously so implemented that the hoisting device has an axle 16, and at least one rope pulley 15-1, 15-2 is on the same axle 16 as the through-hole 6 of the fastening device 3. In such a case the fastening device 3 is able to rotate about the axle 16 in a first direction of movement. Alternatively, the fastening device 3 may be fastened with one or more bolts. The through-hole 6 may also have a different shape, such as a saddle surface, that is, of the type of a surface on an inner circle of a torus ring, or oval, whereby the inner surfaces of the oval hole are curved and the axle 16 is cylindrical, which allows the fastening device 3 to tilt in a second direction of movement.

The through hole 6 is slightly larger than the axle 16 adapted in it, whereby a first wedge-like structure 9 may to some extent tilt transversely in relation to the axle 16. In addition to a cylinder, the adapting surface of the through-hole 6 and axle 16 may also be a saddle-like surface, such as a cylindrical axle and an inward-bulging inner surface of the through-hole 6.

Figure 2:
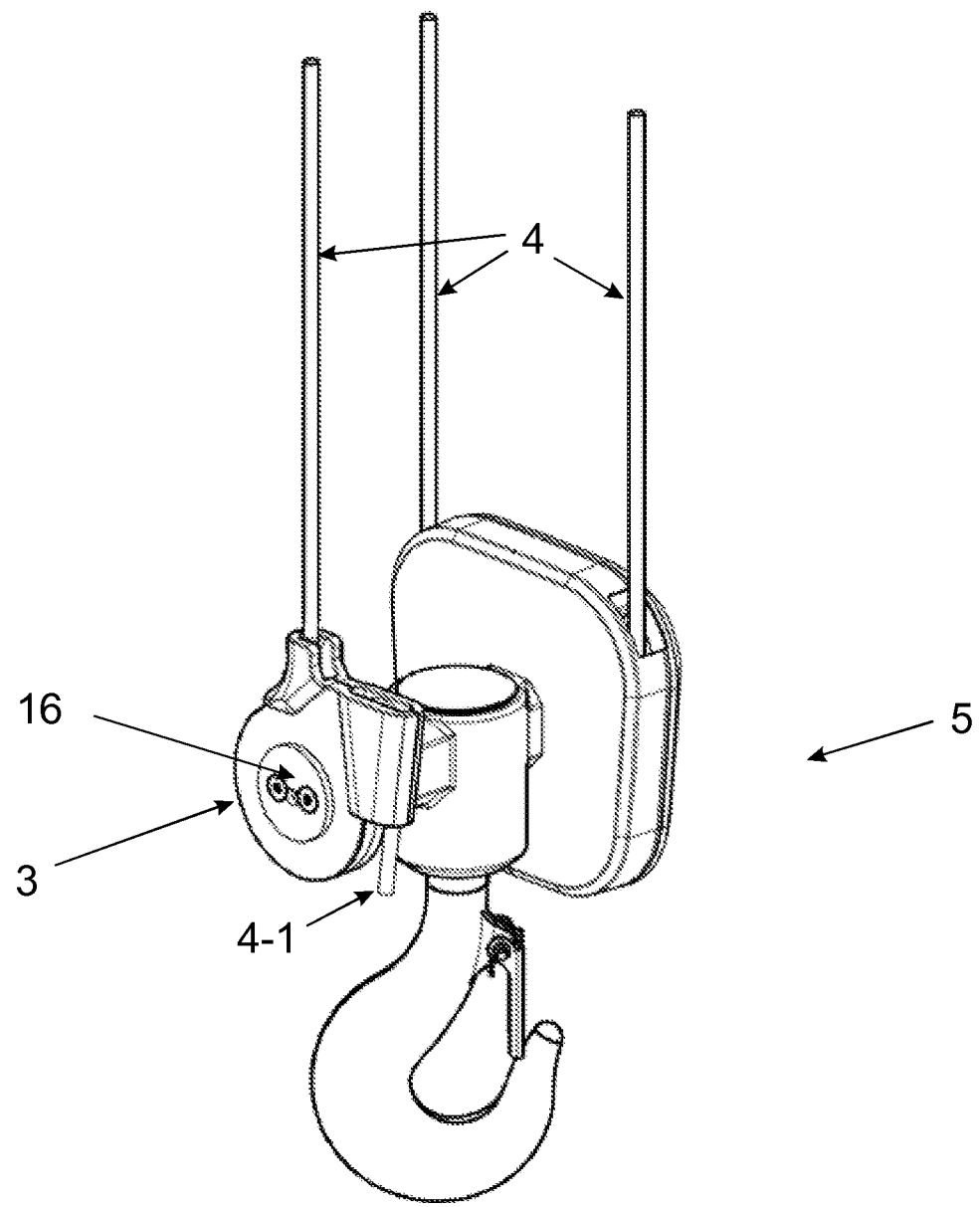
FIG. 2 shows a hoisting member of the hoisting device according to FIG. 1, to which the inventive rope fastening arrangement is fastened.

FIG. 2 shows a hoisting member 5 where the fastening device 3 is fastened to the hoisting member 5 upside down compared to the fastening device 3 of the hoisting device 1 of FIG. 1. Fastening to the hoisting member 5 is advantageously implemented with the rope pulley 15 of the hoisting member 5 on the same axle 16. Alternatively, this too may be fastened with bolts, only, to the hoisting member 5.

In this case, the number of ropings is odd. In the embodiment of FIG. 2, a three-fold suspension is used. The number of ropings affects the hoisting rate and load capacity of the hoisting device. With less ropings, the hoisting member 5 ascends and descends faster but the load bearing capacity is reduced. When the number of ropings is odd and the hoisting rope 4 is terminated at the hoisting member 5, the first end 4-1 of the hoisting rope 4 is advantageously directed downward.

The suspension may alternatively be one-fold with one rope, in other words the roping may be denoted 1×1 whereby the hoisting rope 4 descends directly to the hoisting member 5 from the rope drum 17 without the hoisting rope 4 going around a single rope pulley 15-1 or 15-2. The fastening device 3 may also be in a different orientation than what is shown in FIGS. 1 and 2, so horizontal, for example.

Figure 3:
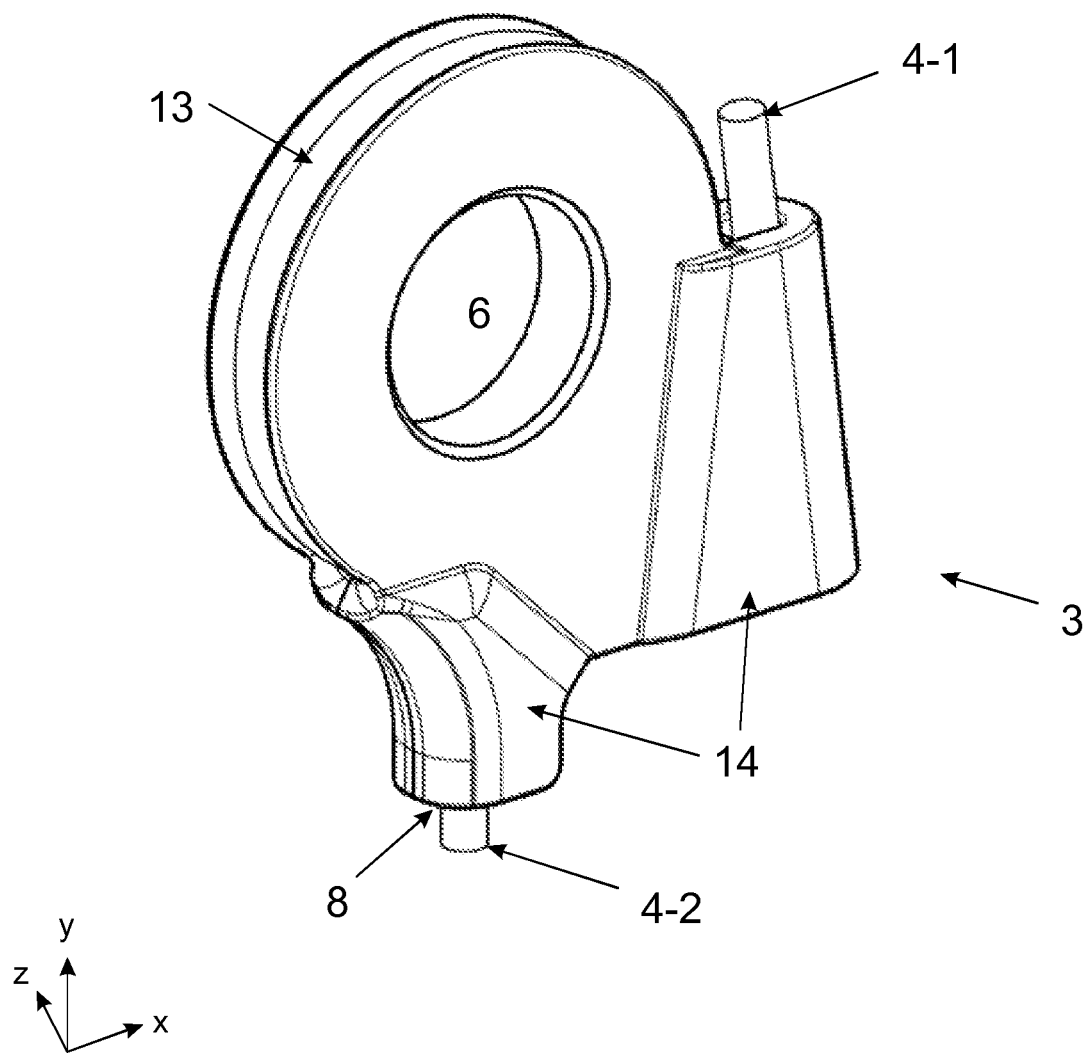
FIG. 3 shows a first embodiment of the inventive rope fastening arrangement.
Figure 4:
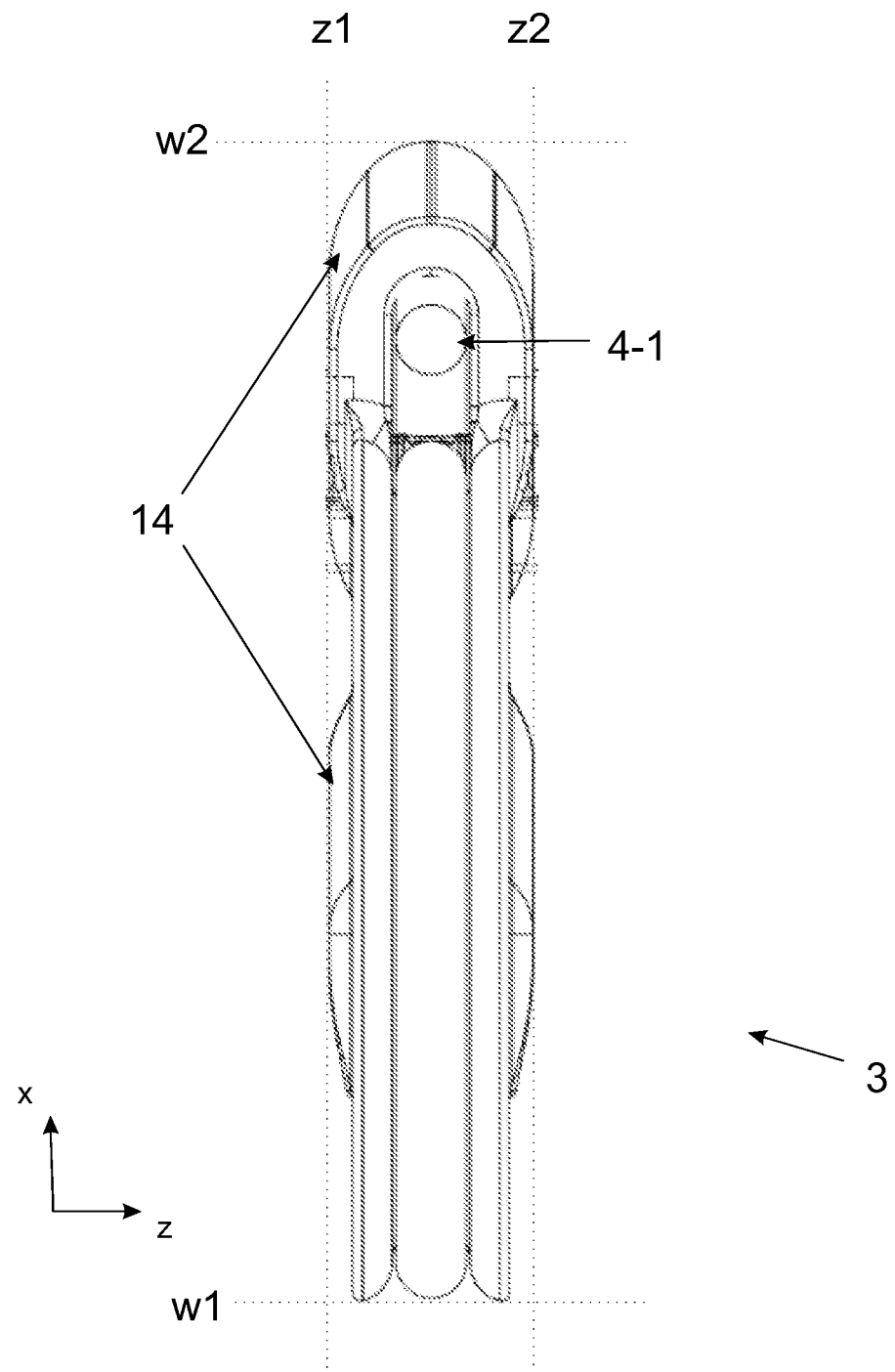
FIG. 4 is a top view of the embodiment of FIG. 3.
Figure 5:
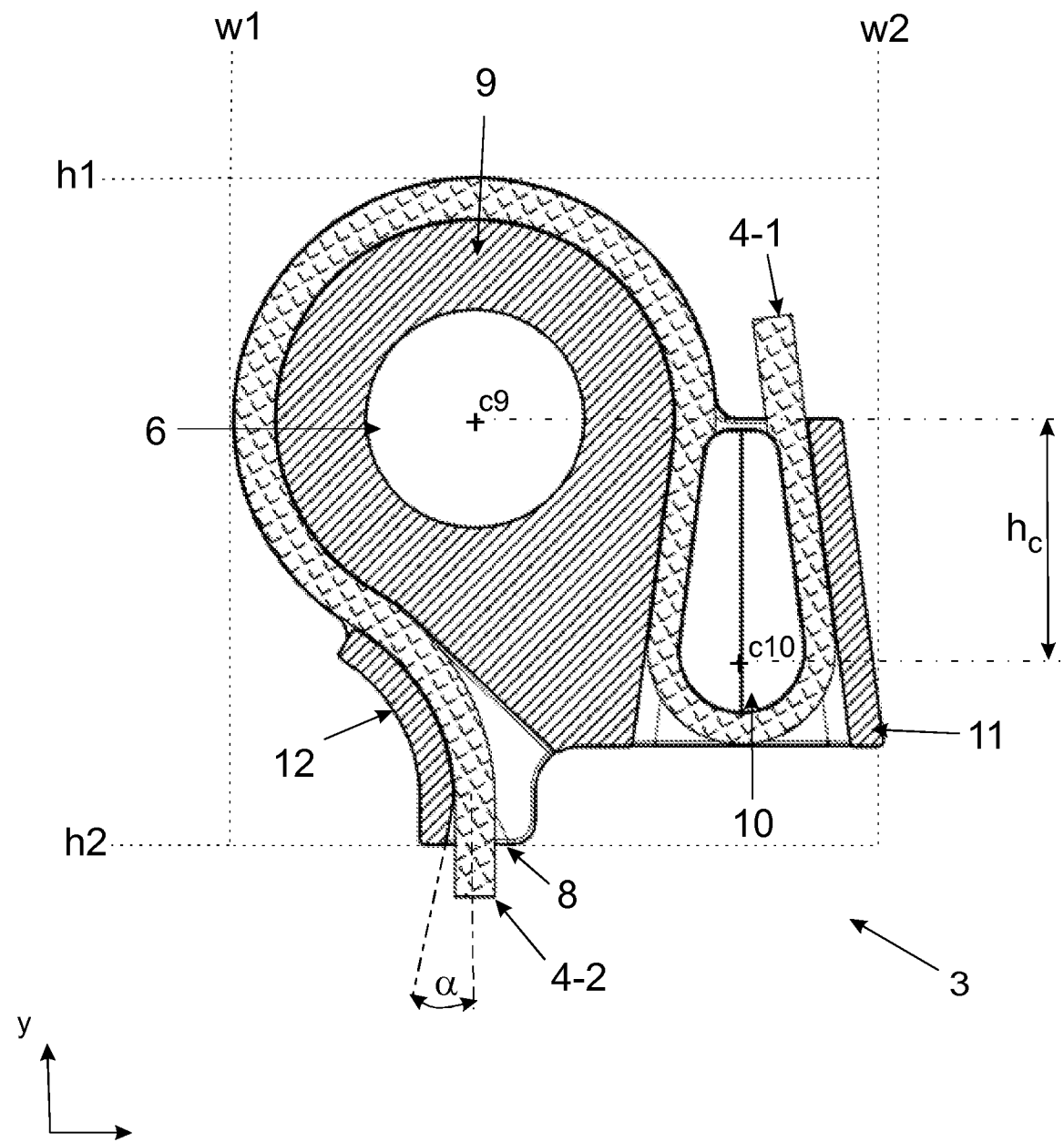
FIG. 5 shows a cross section of the rope fastening arrangement of FIG. 3.

FIGS. 3 to 5 show a first preferred embodiment of the fastening device 3, which may be utilized in the hoisting device 1 shown in FIG. 1. FIG. 3 is a side view of the fastening device 3, and FIG. 4 is a top view thereof. FIG. 5 shows a cross section in the xy direction of the fastening device 3 according to the embodiment of FIGS. 3 and 4. The fastening device 3 may also be in an elevator or another hoisting device in which goods, persons, or animals are lifted or lowered by means of a rope.

The hoisting device 3 has a chamber 14 having an exit opening 8 from which the hoisting rope 4 protrudes out of the chamber 14. The through-hole 6 is in the perpendicular direction in relation to the direction of the exit opening 8 and extends through the fastening device 3. The through-hole 6 and exit opening 8 are mutually on a vertical line whereby the hoisting rope 4 is subjected to tensile stress, only, below the fastening device 3. The structure seeks to turn to this position by the effect of gravity. The chamber 14 comprises a curved wall 12 and a straight wall 11, as well as defines the vertical boundary dimensions h1, h2, the horizontal boundary dimensions w1, w2, and depth direction boundary dimensions z1, z2 of the fastening device 3.

The hoisting rope 4 is locked to the fastening device 3 by wedging, whereby the fastening device 3 guides the first end 4-1 of the hoisting rope 4 away so that the first end 4-1 of the hoisting rope does not extend outside the vertical boundary dimensions h1, h2 of the chamber 14. In the exemplary case of the figures, the first end 4-1 does not advantageously extend outside the horizontal boundary dimensions w1, w2 or depth direction boundary dimensions z1, z2 of the chamber 14 either, although this is not necessary in all the embodiments. The hoisting member 5 may be hoisted so that the first end 4-1 of the rope is not an obstacle for hoisting and does not restrict how high the hoisting member 5 may be hoisted, either, as the hoisting member 5 approaches from below surfaces under the hoisting device 1.

FIG. 5 shows how it is possible to form an adequately long frictional length in a relatively small space to reliably fasten the hoisting rope 4. It is additionally easy to thread the hoisting rope 4 in place, and similarly to detach it, taking also into account the smallest allowed bending radius of the ropes.

As seen in FIG. 5, the fastening device 3 comprises a first wedge-like structure 9 which has a round portion and a triangular portion whose flanks narrow towards each other away from the round portion, and a second wedge-like structure 10 which has a round portion and a triangular portion whose flanks narrow towards each other away from the round portion whereby the first wedge-like structure 9 and second wedge-like structure 10 are side-by-side so that their wedge-like portions are directed to almost opposite directions, and so that the hoisting rope 4 is between the first 9 and second wedge-like structure 10. The wedge-like structures 9, 10 may be of different sizes or alternatively of the same size. In the embodiments shown in the attached drawings, the first wedge-like structure 9 is larger than the second wedge-like structure 10. The second wedge-like structure 10 may be a stand-alone and separate member which becomes wedged firmly in place as the hoisting rope 4 tightens around it, and at the same time the rope is reliably locked to the fastening device 3. In the arrangement of FIG. 5, the pulling force on the hoisting rope 4 between the first end 4-1 and second end 4-2 of the rope is adequate for the tightening locking.

The hoisting rope 4 enters the chamber 14 of the fastening device 3 between a flank of the first wedge-like structure 9 and the curved wall 12 of the chamber 14, goes around the first wedge-like structure 9 touching its round section, protrudes from between the first 9 and second wedge-like structure 10 touching the flanks of the first 9 and second wedge-like structures 10, goes around the second wedge-like structure 10 touching its round portion and protrudes from between the flank of the second wedge-like structure 10 and the straight wall 11 of the chamber 14 out of the chamber 14. In this embodiment, the through-hole 6 extends through the first wedge-like structure 9 but it may alternatively pass through any point within the boundary dimensions defined by the chamber 14 of the fastening device 3.

When the rope is tightened in place, the distance $h_c$ between the centres of rotation, or hubs, c9, c10 of the wedge-like structures 9, 10 is reduced. Hub, in this context, refers to the centre point of the widest part in the round portion of the wedge-like structure. The first wedge-like structure 9 is slightly larger than the second wedge-like structure 10. When the hubs c9, c10 approach each other as the hoisting rope 4 is being tightened in place, the rotation directions of rope grooves are opposite and, due its small size, there is free space left close to the second wedge-like structure 10, which means that the first end 4-1 of the hoisting rope may be terminated in the free space. Free space refers to the portion defined by and within the boundary dimension of the fastening device 3, which has no other structural parts such as wedge like structures 9, 10 in it. This means that the size of the fastening device 3 is reduced and a space-saving solution is achieved, which is reliable as a fastening for the hoisting rope 4.

The through-hole 6 is placed at the same vertical in relation to the exit opening 8, whereby the rope force caused by a load is directly exerted on the axle 16 in the through-hole 6. Gravity seeks to turn the structure to this vertical situation, but by positioning and design it may be seen to that the exit opening 8 can turn or tilt under the through-hole 6, and that the hoisting rope 4 is guided directly downward without such tight bends in which the bending angle $\alpha$ is exceeded. The bending angle $\alpha$ is the angle between the curved wall 12 and the second end 4-2 of the vertical hoisting rope, and may be, for example, 15 degrees or more.

The sides of the walls 11, 12 of the wedge-like structures 9,10 and the chamber may be provided with a groove, along which the hoisting rope 4 runs. The groove 13 is substantially round, or at least rounded, and the shape of the groove 13 is substantially semi-circular, and the dimensioning of the groove 13 is a close match with the outer diameter of the hoisting rope 4 being used. To increase friction, the surface of the groove 13 may be treated with a coating, for example, or by forming friction-increasing protrusions at the manufacturing stage.

Due to the friction surface, a separate locking part for the first end 4-1 of the hoisting rope 4 is not needed, but the hoisting rope 4 stays locked in the fastening device 3 by mere friction. If need be, one or more strain relief clamps may be placed on the first end 4-1, which compress around the rope, to secure the locking.

The first end 4-1 of the hoisting rope stays inside the vertical boundary dimensions h1, h2, of the chamber, and in some cases also within the horizontal boundary dimensions w1, w2 and depth direction boundary dimensions z1, z2, for the fastening device 3 to be as compact as possible. The first end 4-1 in such a case makes it possible to lift the hoisting member 5 as high as possible and to lower it as low as possible, making use of the available free hoisting height.

Before the exit opening 8, the hoisting rope 4 is between the first wedge-like structure 9 and the curved wall 12 of the chamber 14. The curved wall 12 adds to the friction surface of the hoisting rope 4 and at the same time guides the hoisting rope downward. When the fastening device 3 is in the hoisting member 5, the order is the opposite, that is, the first end 4-1 of the hoisting rope points downward and the exit opening 8 upward.

The hoisting rope 4 is easy to thread to the fastening device 3, and the manufacture of the fastening device 3 may be performed by casting or 3D printing, for example. The assembly of the fastening device 3 works out due to its simple structure. Furthermore, the hoisting rope 4 is easy to remove and replace by knocking off the second wedge-like structure 10 from its narrowing chamber 14. Fastening to the hoisting device 1 may be with the aforementioned axle 16 or with another fastening arrangement, such as with bolts, only.

In the embodiment shown in FIG. 5, the hoisting rope 4 first winds clockwise, then counter-clockwise. Alternatively, the winding directions may be carried out in the opposite order, that is, first counter-clockwise, then clockwise. The fastening device 3 may thus make use of a rope groove winding in two different directions, which rope groove may be described as being a letter S shaped. The radii of curvature describing the magnitude of these S-curves may differ in size. If the radius of curvature r9 of the first wedge-like structure 9 is larger than the radius of curvature r10 of the second wedge-like structure 10, aforementioned free space may advantageously be formed after the rope groove straightens after the second S-curve. The first end 4-1 of the rope may then be terminated in this free space. This way, the rope may be set in the same fastening device in as compact a manner as possible, the boundary dimensions remain small, and the first end 4-1 of the rope may be terminated close to the fastening device 3 itself. The axle 16 supporting the fastening device 3 is advantageously positioned inside the S-curve whose radius of curvature is larger. The winding amount of the winding directions may be expressed as a number of the central angle around the rotatable hub c9, c10. The sum of the central angles may exceed 300 degrees, for example.

The axle 16 may be supported on one end, only, as a projecting pin. In such a case, the hoisting rope 4 may go around the first wedge-like structure 9 at approximately twice the radius in relation to the radius of the axle 16, as shown in FIGS. 3 and 5. If the axle 16 is supported in a double-shear manner as a fork suspension, the axle 16 may be thinner whereby the hoisting rope 4 goes around the first wedge-like structure 9 at more than a double radius in relation to the radius of the axle.

In FIGS. 3 and 5, the through-hole 6 is substantially in the middle of the first wedge-like structure 9 but it may also be eccentrically located in the first wedge-like structure 9, when taking into account that the hoisting rope 4 may come off downward without bending stress. By positioning the through-hole 6 eccentrically, the height or height position of the rope fastening may possibly be reduced, whereby the achieved benefit is a larger hoisting height below the structure.

When the hoisting rope 4 is adapted to go around the first wedge-like structure 9, a compression force in the direction of the radius of the through-hole 6 and axle 16 from the groove 13 of the rope is exerted on the first wedge-like structure 9. This compression does not load the first wedge-like structure 9 with shearing stress, so the solution is structurally firm. The hoisting rope 4 goes around both the first wedge-like structure 9 and the shaft 16 reserved for its fastening. If the first wedge-like structure 9 were to crack, the structure is secured in that the hoisting rope 4 also goes around the axle 16 itself. This means that the falling of a load being hoisted slows down, in at least some cases, because the hoisting rope 4 is adapted to go around the axle 16.

Figure 6:
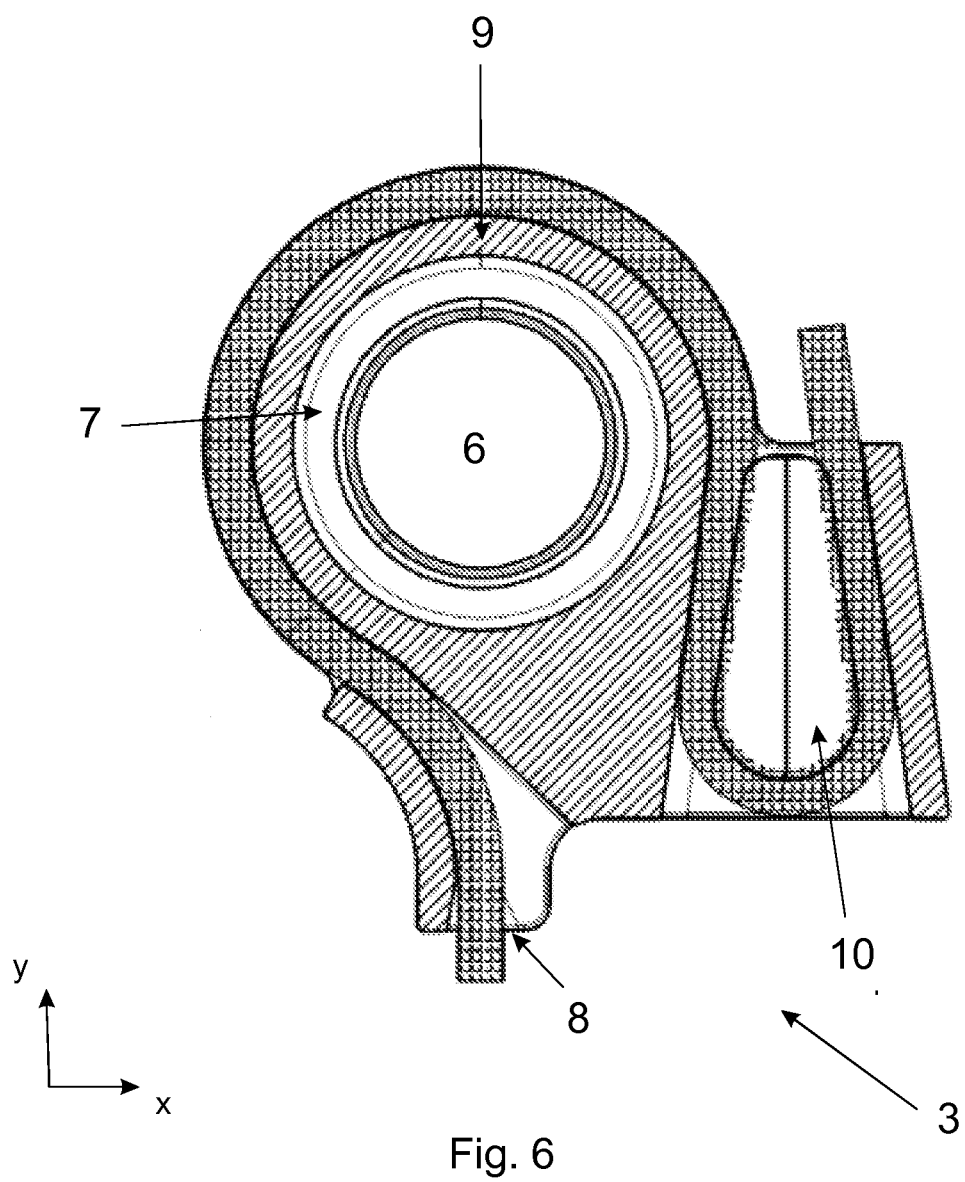
FIG. 6 shows a second embodiment of the inventive rope fastening arrangement.

FIG. 6 shows a second preferred embodiment of the fastening device, which may be utilized in the hoisting device of the FIG. 1 embodiment. The embodiment of FIG. 6 very largely corresponds to the embodiment of FIG. 5, which is why the embodiment of FIG. 6 will be explained primarily by disclosing differences between these embodiments.

In FIG. 6, the through-hole 6 of the fastening device 3 may have a bearing 7, such as an articulation bearing, making it possible for the fastening device 3 to rotate around the axle 16 extending through the through-hole 6 in a first direction of movement, and in addition the tilting of the fastening device 3 in relation to the axle 16 extending through the through-hole 6 in a second direction of movement. In such a case, the hoisting member 5 may be freely moved in two directions of movement without bending the hoisting rope 4 at the exit opening 8. The length of the hoisting rope 4 between the fastening device 3 and hoisting member 5 of the hoisting device 1 also restricts how large a radius of operation the hoisting member 5 has in relation to the fastening device 3.

Figure 7:
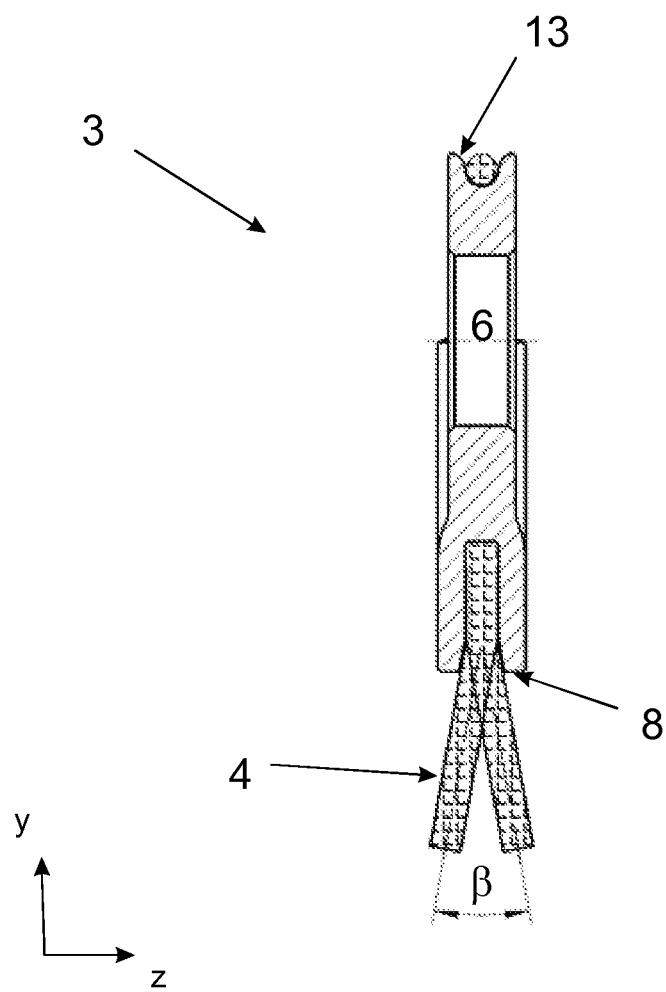
FIG. 7 shows the rope fastening arrangement of FIG. 3, with a widening exit opening.

FIG. 7 shows a cross-sectional view in the zy direction of FIG. 3 at the exit opening 8. The exit opening 8 of the lower end of the hoisting rope is widening, that is, the cross-sectional area of the exit opening 8 increases outward of the chamber 14 (i.e. downward in FIG. 4), which allows the hoisting rope 4 to be moved in two directions in relation to the fastening device 3. In accordance with FIG. 5, one opening surface may be openable in a curved manner, and the other surface may be substantially straight. The angle β of the opposite sides of the exit opening 8 may be 20 degrees or more. The angle α between the curved wall 12 and the second end 4-2 of the vertical hoisting rope shown in FIG. 5 may be 15 degrees or more, whereby the widening angles α and β form the widening exit opening 8. This may be part of the embodiment of FIGS. 3 to 6 or an alternative solution for the axle 16 and bearing 7 of the through-hole 6.

Figure 8:
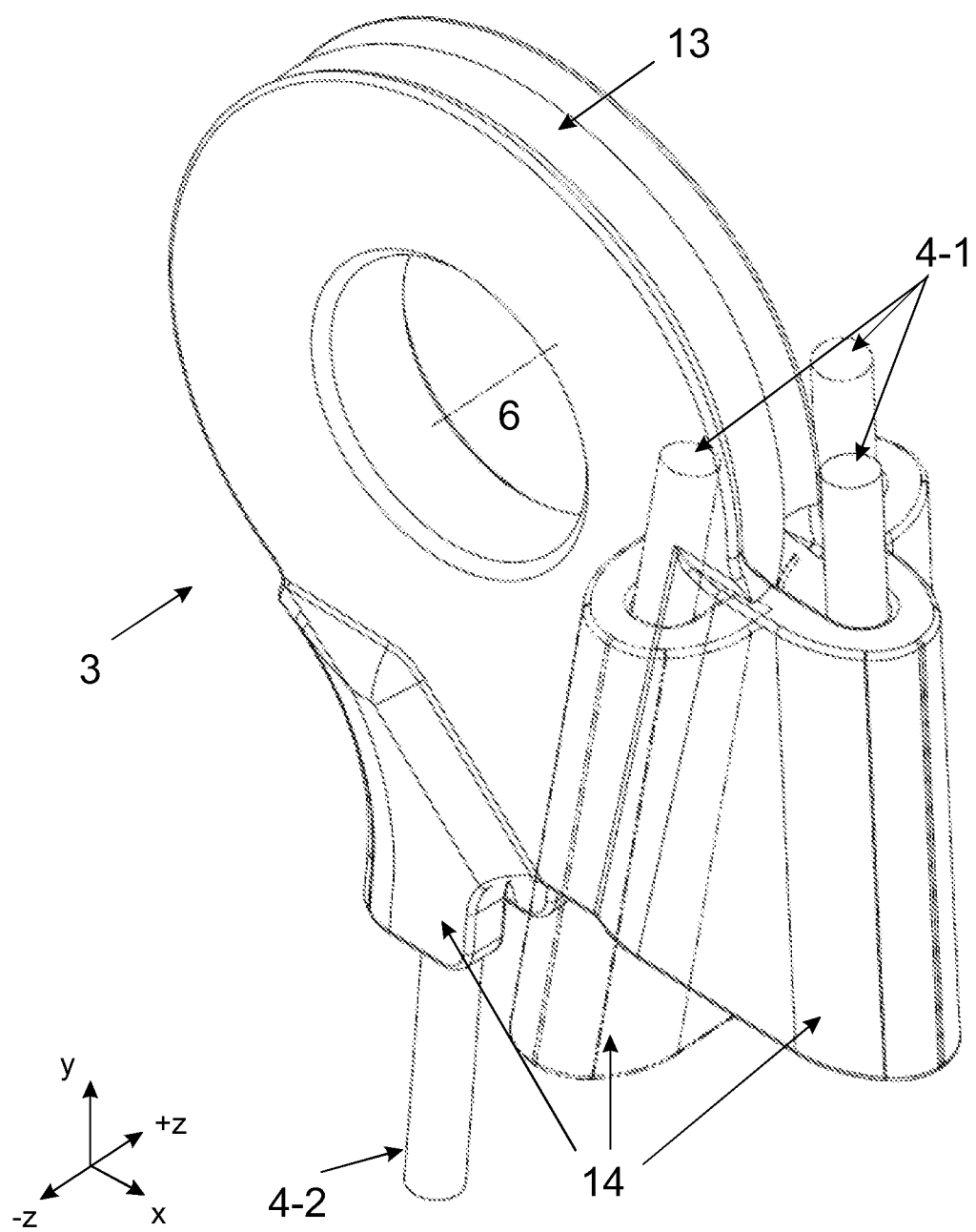
FIG. 8 shows a third embodiment of the inventive rope fastening arrangement.

FIG. 8 shows the third preferred embodiment of the fastening device 3. The embodiment of FIG. 8 very largely corresponds to the embodiment of FIG. 3, which is why the embodiment of FIG. 8 will be primarily explained by disclosing differences between these embodiments.

FIG. 8 shows, in the same drawing, three alternative positions in which the second wedge-like structure 10 may be formed. Of these three positions, the most suitable form may be selected, which best suits the structure of the hoisting device. The position presented with solid lines, which is in the same xy plane as the first wedge-like structure 9, is the embodiment shown in FIG. 3. In this embodiment, the grooves 13 of the hoisting rope 4, which are around the wedge-like structures 9, 10, are in the xy plane.

The positions presented with dotted lines are in the zy plane, and the second wedge-like structure 10 is formed at a lower point in relation to the first wedge-like structure 9. Once the hoisting rope 4 has gone round the first wedge-like structure 9, it may be turned aside, by e.g. 90 degrees, whereby the position of the second wedge-like structure 10 is formed on the right (−z) or left (+z) side in relation to the plane of the first wedge-like structure 9. The desired handedness of the fastening device 3 may be selected according to the structure of the hoisting device structure. Depending on the handedness, a fastening device 3 expanding in −z or +z directions may be utilized.

Figure 9:
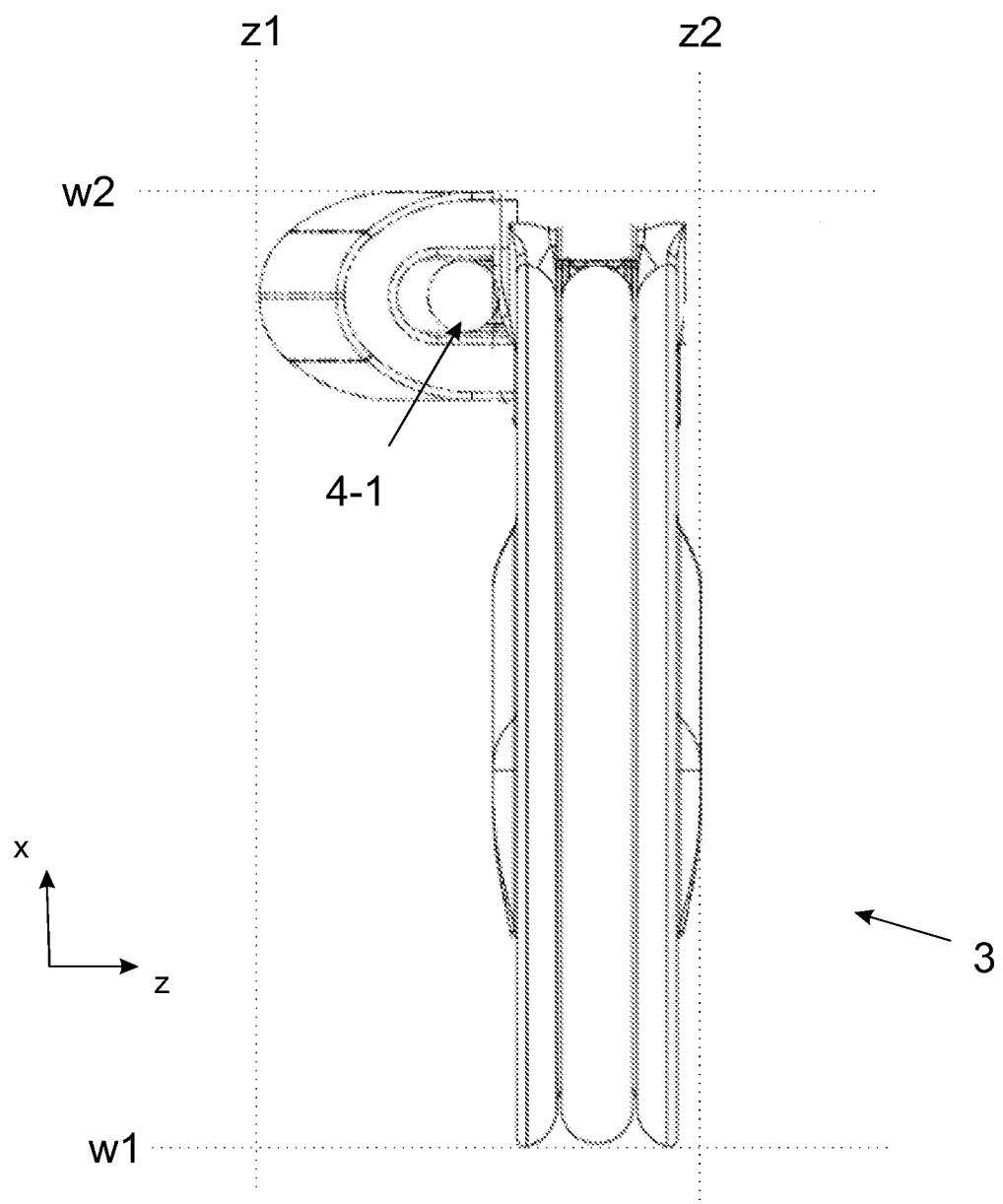
FIG. 9 is a top view of a position of FIG. 8.

FIG. 9 is a top view of a position of FIG. 8, formed on a side and viewed in the zx plane. This figure shows how the first end 4-1 of the rope does not extend outside the horizontal boundary dimensions w1, 2w or the depth direction boundary dimensions z1, z2, whereby the fastening device 3 is kept compact and simple.

Those skilled in the art will find it obvious that, as technology advances, the basic idea of the invention may be implemented in many different ways. The invention and its embodiments are thus not restricted to the above-described examples but may vary within the scope of the claims.

The invention claimed is:

1. A rope fastening arrangement of a hoisting device, comprising;
   a rope drum;
   a fastening device having a chamber which defines the vertical boundary dimensions, the horizontal boundary dimensions, and depth direction boundary dimensions of the fastening device;
   a hoisting rope; and
   a hoisting member which ascends and descends by means of the hoisting rope, supported by the fastening device and rope drum,
   wherein the hoisting rope is locked to the fastening device by wedging, whereby the fastening device guides a first end of the hoisting rope away so that the first end of the hoisting rope does not extend outside the vertical boundary dimensions of the chamber,
   wherein the fastening device comprises a first wedge-like structure which has a round portion and a triangular portion whose flanks narrow towards each other away from the round portion, and a second wedge-like structure which has a round portion and a triangular portion whose flanks narrow towards each other away from the round portion whereby the first wedge-like structure and second wedge-like structure are side-by-side so that the hoisting rope is between the first and second wedge-like structure and squeezed between the wedge-like portions, and
   wherein a through-hole extends through the first wedge-like structure and has a saddle surface.

2. The rope fastening arrangement as claimed in claim 1, wherein the fastening device guides the first end of the hoisting rope away so that the first end of the hoisting rope does not extend outside horizontal boundary dimensions or depth direction boundary dimensions of the chamber.

3. The rope fastening arrangement as claimed in claim 1, wherein the hoisting device additionally comprises at least one rope pulley via which the hoisting rope runs to the fastening device from the rope drum.

4. The rope fastening arrangement as claimed in claim 3, wherein the hoisting device has an axle, and the at least one rope pulley is on the same axle as the through-hole of the fastening device.

5. The rope fastening arrangement as claimed in claim 4, wherein the through-hole of the fastening device has a bearing which allows the tilting of the fastening device in relation to the axle extending through the through-hole.

6. The rope fastening arrangement as claimed in claim 1, wherein the chamber comprises a curved wall and a straight wall.

7. The rope fastening arrangement as claimed in claim 1, wherein the hoisting rope is squeezed between the walls of the chamber.

8. The rope fastening arrangement as claimed in claim 1, wherein the hoisting rope enters the chamber of the fastening device between the flank of the first wedge-like structure and a curved wall of the chamber, goes around the first wedge-like structure touching its round portion, protrudes from between the first and second wedge-like structure touching the flanks of the first and second wedge-like structures, goes around the second wedge-like structure touching its round portion and protrudes from between the flank of the second wedge-like structure and the straight wall of the chamber out of the chamber.

9. The rope fastening arrangement as claimed in claim 1, wherein the first end of the hoisting rope points upward.

10. The rope fastening arrangement as claimed in claim 1, wherein the first end of the hoisting rope points downward.

11. The rope fastening arrangement as claimed in claim 1, wherein the first and the second wedge-like structure have a grooved side along which the hoisting rope passes.

12. The rope fastening arrangement as claimed in claim 1, wherein the chamber has an exit opening from which the hoisting rope protrudes out of the chamber, and before the exit opening the hoisting rope is between the first wedge-like structure and a curved wall of the chamber.

13. The rope fastening arrangement as claimed in claim 12, wherein a cross-sectional area of the exit opening of the fastening device increases when proceeding outward from the chamber.

14. The rope fastening arrangement as claimed in claim 12, wherein the through-hole is perpendicular to the direction of the exit opening.

15. The rope fastening arrangement as claimed in claim 1, wherein the second wedge-like structure is a stand-alone and separate member, whereby as the hoisting rope tightens the distance between hubs of the first wedge-like member and the second wedge-like member decreases.

16. The rope fastening arrangement as claimed in claim 1, wherein the hoisting rope is a round steel rope.

* * * * *